United States Patent [19]

Papchenko et al.

[11] Patent Number: 4,723,483
[45] Date of Patent: * Feb. 9, 1988

[54] ELECTROPLASMOLYZER FOR PROCESSING VEGETABLE STOCK

[75] Inventors: Andrei Y. Papchenko; Mircha K. Bologa; Semen E. Berzoi; Jury N. Paukov; Vasily G. Chebanu; Galina V. Rudkovskaya, all of Kishinev, U.S.S.R.

[73] Assignee: Institut Prikladnoi Fiziki Akademii Nauk Moldav-Skoi SSR, Kishinev, U.S.S.R.

[*] Notice: The portion of the term of this patent subsequent to Sep. 2, 2003 has been disclaimed.

[21] Appl. No.: 881,264

[22] Filed: Jul. 2, 1986

Related U.S. Application Data

[63] Continuation-in-part of Ser. No. 491,169, May 3, 1983, Pat. No. 4,608,920.

[51] Int. Cl.⁴ .............................................. A23L 3/00
[52] U.S. Cl. ....................................... 99/451; 99/483; 99/516
[58] Field of Search ................. 99/352, 358, 451, 483, 99/484, 646 R, DIG. 11–14; 426/234–236, 240, 241, 237, 239, 244, 247, 248; 422/20–22, 23, 186; 219/10.55 R, 10.55 E, 10.55 B, 10.55 F, 288, 289, 291, 293, 295; 210/748; 204/186, 302, 304

[56] References Cited

U.S. PATENT DOCUMENTS 4,608,920 9/1986 Scheglov et al. ..................... 99/451

Primary Examiner—Timothy F. Simone
Attorney, Agent, or Firm—Fleit, Jacobson, Cohn & Price

[57] ABSTRACT

An electroplasmolyzer for processing vegetable stock has a housing accommodating a plurality of electrodes having a planer surface for contacting said vegetable stock being processed and connected to a three-phase power supply. Each of adjacent electrodes in a pair are connected to different phases of the three-phase power supply. An unobstructed passageway extending through the housing is defined adjacent to the terminal portions of the plurality of electrodes.

16 Claims, 12 Drawing Figures

ELECTROPLASMOLYZER FOR PROCESSING VEGETABLE STOCK

This application is a continuation-in-part of application Ser. No. 491,169 filed May 3, 1983, now Pat. 4,608,920.

The above object is accomplished by that in an electroplasmolyzer for processing vegetable stock, comprising a housing defining an inlet opening and an outlet opening and accommodating a plurality of electrodes which are connected to a three-phase power supply, an unobstructed passageway extending through the housing, according to the invention, the plurality of electrodes are distributed uniformly on the whole inner surface of the housing and are connected to the three-phase power supply in such a manner that adjacent electrodes are each connected to different phases of the three-phase power supply in each electrode having a terminal portion and the unobstructed passageway being defined adjacent to the terminal portions of the plurality of the electrodes.

It is preferred that two electrodes having a planar surface for contacting the vegetable stock being processed be located on two opposite walls of the housing along the whole width thereof, the rest of said plurality of identically shaped electrodes with a planar contact surface having chamfered ends located on the side of the inlet opening of the housing and being mounted on two other walls of the housing and spaced at a distance between each other equal to 0.2–0.4 of the width of one of the two electrodes located along the whole width of the wall, and a gap formed between the end faces of the electrodes of identical shape being equal to 0.2–0.4 of the width of one of the two electrodes located along the whole width of the housing wall.

One U-shaped electrode having a planar surface for contacting the stock being processed may be located on three walls of the housing, the rest of the electrodes having a planar contact surface of identical shape being mounted on the fourth wall with the distance between the electrodes equal to 0.2–0.4 of the width of the U-shaped electrode, the ends of the electrodes of identical shape being chamfered on the side of the inlet opening of the housing.

It is also preferred that the distance between electrodes be chosen from the formula $d/\Delta = N - 2$ taking into account the inequality:

The value of $E_{min}$ may be equal to 50 V/cm and the value of $E_{max}$ may be equal to 400 V/cm.

It is preferred that a first, second and third pairs of the identical electrodes having a planar surface for contacting the stock being processed forming a first group of electrodes be located along a cylindrical housing, each of adjacent electrodes being connected to different phases of the three-phase power supply and electrodes of each pair in the first group being located opposite to each other, each pair of electrodes of the first group being located at angle of 90° with respect to each other, and one pair of identical electrodes being located between the electrodes having a planar contact surface to form a second group of electrodes, adjacent electrodes of each pair of the second group being located opposite to each other, the axes of symmetry of electrodes of the first, second and third pairs of electrodes of the first group extending in one and the same plane drawn perpendicularly to the longitudinal axis of the housing with the axes of symmetry of electrodes of the first, second and third pairs of electrodes of the second group, respectively, the distance between the end faces of electrodes in any pair of electrodes of the second group being equal to the distance between the electrode having a planar surface for contacting the stock being processed in any pair of electrodes of the first group and the electrode of the like pair of electrodes in the second group, and the peripheral surface of the electrode in each pair of electrodes of the second group being conjugated with its base by a surface of a radius equal to the distance between the electrode having a planar contact surface for contacting the stock being processed of any pair of electtrodes of the first group and the electrode of the like pair in the second group, the electrodes in each pair of electrodes in the second group being connected to different phases of the three-phase power supply, each of adjacent electrodes spaced along a circle in a plane drawn perpendicularly to the longitudinal axis of the housing being connected to different phases of the three-phase power supply.

BRIEF DESCRIPTION OF THE DRAWINGS

The invention will be made apparent upon considering the following detailed description of an exemplary embodiment thereof, with due references to the accompanying drawings in which.

DETAILED DESCRIPTION OF THE INVENTION

Figure 1:
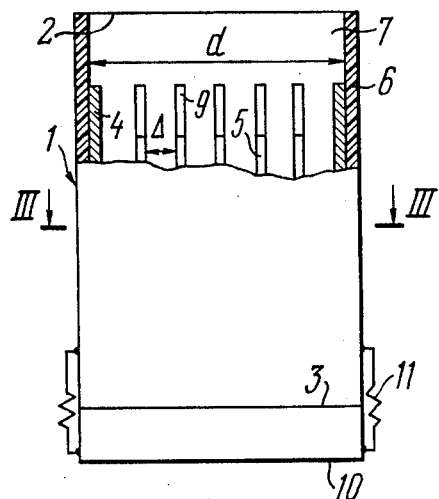
FIG. 1 is a general view of an electroplasmolyzer for processing vegetable stock, having a rectangular housing with two rows of electrodes of identical shape, according to the present invention.

Referring now to FIG. 1 of the accompanying drawings, a rectangular housing 1 of the herein disclosed electroplasmolyzer is made of a dielectric and has an inlet opening 2 and an outlet opening 3. Positioned inside the housing 1 in parallel with the longitudinal axis thereof are some electrodes 4 and other electrodes 5, having a plane surface of contact with vegetable stock being processed (not shown in the drawing). Two electrodes 4 are attached to walls 6 across the entire width thereof while the electrodes 5 of identical shape are attached to two other opposite walls 7. The uniform distribution of the electrodes 5 inside the electroplasmolyzer housing 1 is provided for by the relationship $d/66 = N-2$, with due regard for the inequality $E_{min} \leq V/\Delta E_{max}$, where $E_{min}$—minimum value of electric field intensity;
$E_{max}$—maximum value of electric field intensity;
d—width of the wall 7 to which the electrodes 5 are attached;
$\Delta$—distance between the electrodes 5;
N—total number of the electrodes 4, 5;
V—voltage.

The $V/\Delta$ ratio characterizes the value of electric field intensity. Therefore, at values below 50 V/cm there is observed a sharp increase of the amount of time required for electric processing of vegetable mass, whereas values above 400 V/cm can only be attained with the aid of special transformer means for increasing the voltage applied to the electroplasmolyzer.

The minimum value of electric field intensity for flow processing of vegetable stock is $E_{min}=50$ V/cm. The maximum value of electric field intensity, $E_{max}=400$ V/cm, is obtained from commercial-frequency a.c. mains without the use of transformer means.

It follows from the relationship $d/\Delta = N-2$ that the distance between the electrodes 5 should be selected in the range of from 20 to 40 mm. For example, given the width of the wall 7 with the electrodes 5 of d=280 mm and the distance between the electrodes 5 of $\Delta = 40$ mm, the number of the electrodes 5 equals $280/40=7-2=5$. A reduction of the distance between the electrodes 5 to a value less than 20 mm may result in the sticking of vegetable mass between the electrodes 5 while an increase of said distance to a value over 40 mm will require higher values of electric field intensity which can only be attained with the aid of special transformer means increasing the voltage across the electroplasmolyzer.

Figure 2:
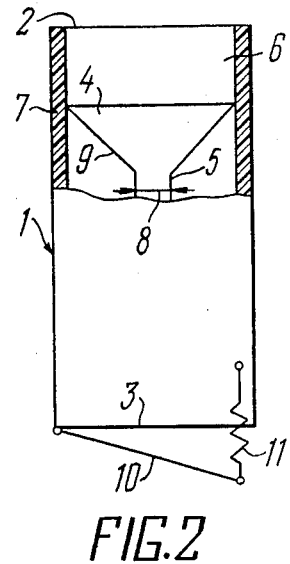
FIG. 2 is a side view of an electroplasmolyzer with a regulating valve on the outlet opening of the housing, according to the present invention.

FIG. 2 is a side view of the electroplasmolyzer housing 1. The electrodes 5 attached to two opposite walls 7 to form a gap 8 have, on the side of the inlet opening 2, ends 9 chamfered at an angle of 30°-60° to the longitudinal axis of the housing 1. Should the angle of chamfer of the chamfered ends 9 be less than 30°, foreign matter such as leaf or straw particles may be retained on the end face of the electrode 5, while an angle of chamfer over 60° would lead to a sharp reduction of the surface of the electroplasmolyzer electrodes 5. The gap 8 between two rows of the electrodes 5 is equal to 0.2-0.4 width of one of the electrodes 4. The provision on the output opening 3 of a regulating valve 10 with a spring 11 ensures delivery pressure and good contact of the pulp (not shown in the drawing) with the electrodes 4, 5.

Figure 3:
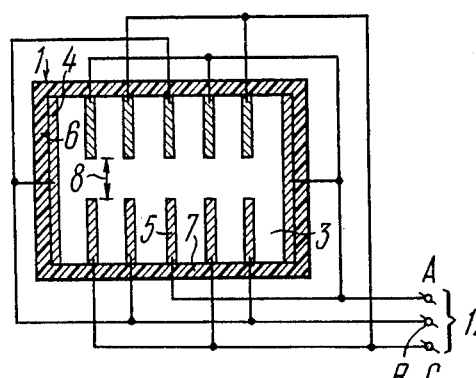
FIG. 3 shows a cross-section of the electroplasmolyzer taken along the line III—III of FIG. 1, and a circuit diagram of electrode connection to the power supply, according to the invention.

FIG. 3 shows a cross-sectional view of the electroplasmolyzer with a circuit diagram of connections of the electrodes 4, 5. Attached to the walls 6 of the housing 1 are the electrodes 4, while two rows of the electrodes 5 of identical shape are positioned on two other opposite walls 7. Provided between the rows of the electrodes 5 in the center of the housing 1 is the gap 8 equal to 0.2-0.4 width of one of the electrodes 4. The electric processing of vegetable stock is effected between the end faces of the opposite electrodes 5 since the latter are connected to different phases A, B, C of an a.c. power supply 12. A reduction of the gap 8 between the electrodes 5 to a value between 0.2 width of the electrode 4 may lead to electric breakdown of the mass of vegetable stock and, consequently, to nonuniform processing, while an increase of the gap 8 to a value in excess of 0.4 width of the electrode 4 would lead to incomplete electric processing of vegetable stock.

One of the electrodes 4 is connected to phase A, with the first column of adjacent electrodes 5 connected to phases B and C, the second column—to phases A and C, the third column—to phases A and B, the fourth column—to phases B and C, the fifth column - to phases A and C, and the second electrode 4—to phase B. The electrodes 4 and 5 are connected uniformly to all three phases A, B and C.

In view of the foregoing, the number of the electrodes 4, 5 in the electroplasmolyzer is selected such that it would be divisable by three, with each pair of adjacent electrodes 5 connected to different phases A, B, C. It is therefore that twelve electrodes 4, 5 are shown in FIG. 3, ten out of them being the electrodes 5.

Figure 4:
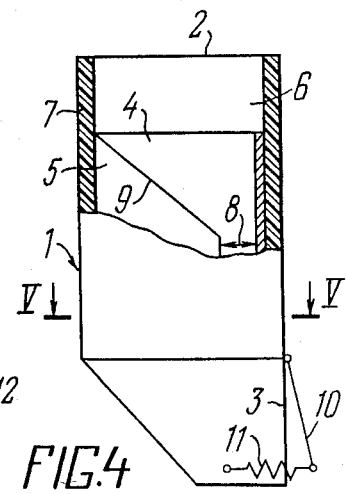
FIG. 4 is a side view of an electroplasmolyzer for processing vegetable stock, having a rectangular housing with a single row of electrodes of identical shape and with a regulating valve on the outlet opening of the housing, according to the present invention.

FIG. 4 illustrates an electroplasmolyzer with a single row of the electrodes 5 (side view). The housing 1 has inlet opening 2 and outlet opening 3 provided with the regulating valve 10 and spring 11.

Attached to opposite walls 6 of the housing 1 and to one of the walls 7 is a square-shaped electrode 4 with plane contact surface. Electrodes 5 are attached to the other wall 7 and, on the side of the inlet opening 2, have ends 9 chamfered at angles of 30°-60° to the longitudinal axis of the housing 1. The provision of chamfered ends 9 of the electrodes 5 precludes fibrous foreign matter from accumulating on top end faces of said electrodes and facilitates the conveyance of such foreign matter to the gap 8 formed by the row of electrodes 5 and square-shaped electrode 4 and equal to 0.2-0.4 width of the square-shaped electrode 4.

Figure 5:
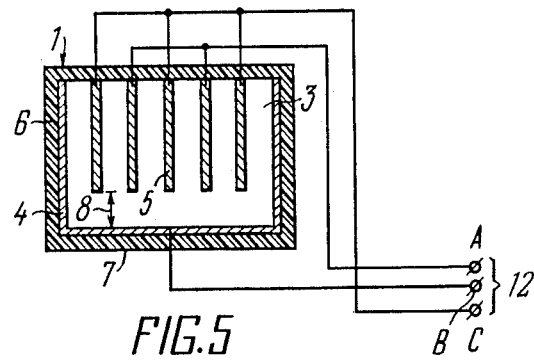
FIG. 5 shows a cross-section of the electroplasmolyzer, taken along the line V—V of FIG. 4, and a circuit diagram of electrode connection to the power supply, according to the present invention.

FIG. 5 is a cross-sectional view of the electroplasmolyzer with a single row of electrodes 5 attached to the wall 7. As a result, the gap 8 is formed between the end faces of the electrodes 5 and square-shaped electrode 4, said gap being equal to 0.2-0.4 width of the square-shaped electrode 4.

The uniform distribution of the electrodes 5 inside the housing 1 of the electroplasmolyzer is ensured by observing the relationship $d/\Delta = N-1$, with due regard for the inequality $E_{min} \leq V\Delta \leq E_{max}$, where d—width of the wall to which the electrodes 5 are attached;
$\Delta$—distance between the electrodes 5;
N—total number of the electrodes 4, 5;
V—voltage of the power supply 12;
$E_{min}$—50 V/cm, $E_{max}=400$ V/cm.

Comminuted vegetable stock is fed continuously from a crusher to the electroplasmolyzer housing 1 to be processed between the electrodes 4 and 5 and in their gap 8.

The circuit diagram of connections of the electrodes 4 and 5 is made three-phase, with the adjacent electrodes 5 connected to different ones of the two phases A and C of the power supply 12, and the square-shaped electrode 4—to phase B. In so doing, there is ensured a uniform and more complete processing of vegetable stock between the electrodes 4 and 5 since adjacent electrodes 4, 5 in each pair thereof are connected to different phases A, B, C of the power supply 12. It should be noted that no deviations are permitted from the specified values of the angle of chamfer of the ends 9 of the electrodes and of the gap 8, as in the case of the electroplasmolyzer shown in FIGS. 2 and 3.

Figure 6:
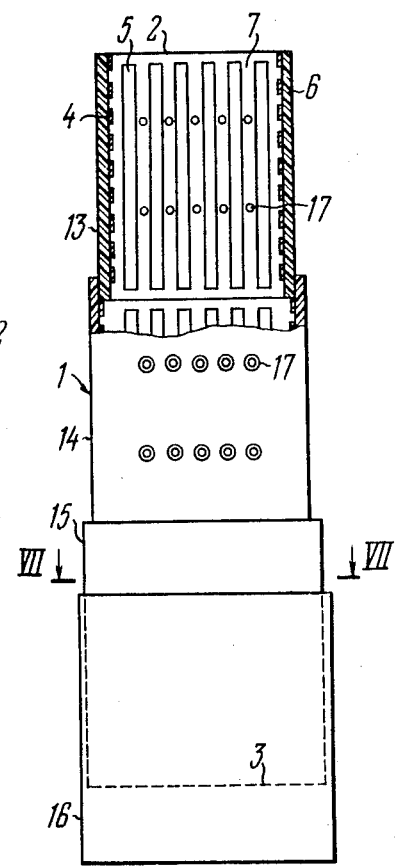
FIG. 6 is a general view of an electroplasmolyzer for processing vegetable stock, with a housing having three sections and a movable casing, according to the present invention.

FIG. 6 is a general view of an electroplasmolyzer with inlet and outlet openings 2 and 3, rectangular housing 1 including at least three sections 13, 14 and 15 and a movable casing 16.

Each one of the sections 13, 14, 15 has walls 6 with electrodes 4 positioned at right angles to the longitudinal axis of the electroplasmolyzer housing 1 and walls 7 with electrodes 5 positioned in parallel with the longitudinal axis of the housing. The electrodes 4 and 5 have a plane surface of contact with vegetable stock being processed. The cross-sectional area of the sections 14 is larger than that of the section 13 while the cross-sectional area of the section 15 is larger than that of the section 14. Such an expansion of the cross-sectional area of the electroplasmolyzer towards the bottom is caused by the need to provide conditions for unobstructed conveyance of comminuted vegetable stock in the form of shavings which intertwine and form lumps readily, this possibly leading to the jamming of the narrow electrode channel.

For regulating the surface over which the shavings spread in a wide hopper of a diffuser (not shown in the drawing) upon their discharge from the housing 1 of the electroplasmolyzer via the outlet opening 3, use is made of the movable casing 16 displaceable along the longitudinal axis of the section 15.

In addition, two rows of jet injectors 17 are positioned on the walls 7 in the sections 13 and 14 of the electroplasmolyzer between the electrodes 5, said jet injectors serving to inject liquid into shavings in order to provide for better contact of vegetable stock with the electrodes 4 and 5, the number of electrodes 4, 5 in each one of the sections 13, 14, 15 being divisible by three.

Figure 7:
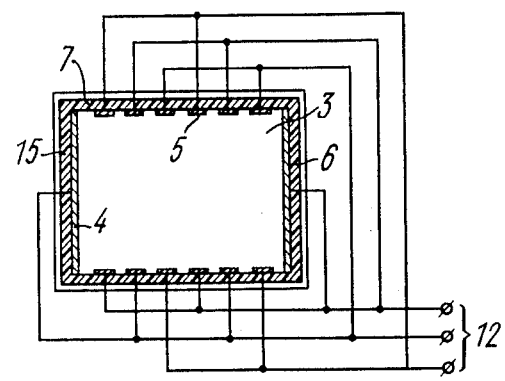
FIG. 7 is a cross-section of the electroplasmolyzer, taken along the line VII—VII of FIG. 6, with a circuit diagram of electrode connection to the power supply, according to the present invention.

FIG. 7 is a cross-sectional view of the electroplasmolyzer with a circuit diagram of connections of the electrodes 4, 5. Given the number of the electrodes 4 and 5 divisible by three, their connection alternates between three phases A, B, C of the power supply 12, thereby ensuring their uniform loading.

In the sections 13, 14, 15 of the electroplasmolyzer housing 1, adjacent electrodes in each pair of the electrodes 4 and 5 positioned on the walls 6 and 7, as well as positioned one opposite each other on the opposite walls 7, are connected to different ones of the phases A, B, C of the power supply 12, the electrodes 5 and jet injectors 17 on the wall 7 (FIG. 6) are likewise connected to different ones of the phases A (FIG. 7), B and C of the power supply 12.

The casing 16 (FIG. 6) is movable along the longitudinal axis of the section 15 of the housing 1 and, upon being adjusted at the required level, is secured in that position.

The circuit diagram of connections of the electrodes 4 and 5 (FIG. 7) is made three-phase, with the electrodes 5 having a plane contact surface being positioned on the opposite walls 7 of the housing 1. They are connected (bottom row) from left to right—the first electrode 5 to phase A, the second electrode 5 to phase B, the third electrode 5 to phase C, the fourth electrode 5 to phase A and so on. The electrodes 5 (top row) are connected as follows: the first electrode 5 to phase C, the second electrode 5 to phase A, the third electrode 5 to phase B, the fourth electrode 5 to phase A and so on; the opposite electrodes 4 positioned on the walls 6 are also connected to different phases, for example, those on the left-hand side—to phase B, and those on the right-hand side—to phase A. The electrodes 4 and 5 are connected uniformly to all of the three phases A, B and C. The jet injectors 17 (FIG. 6) are likewise alternately connected to different phases A, B, C.

Figure 8:
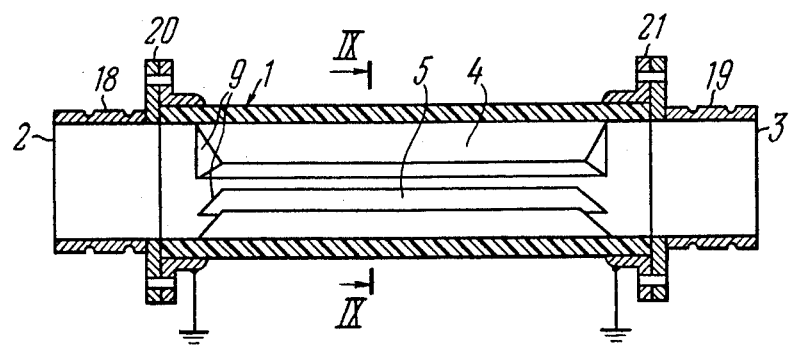
FIG. 8 is a longitudinal sectional view of an electroplasmolyzer with a cylindrical housing, according to the present invention.

FIG. 8 shows the electroplasmolyzer with a cylindrical housing 1, in longitudinal section.

The electroplasmolyzer includes the dielectric housing 1 provided with inlet and outlet openings 2 and 3. Positioned on the inner surface of the housing 1 are three sector-shaped electrodes 4 between which there are provided three electrodes 5 with plane contact surface spaced equidistantly from each other. The length of the electrodes 5 is equal to that of the sector-shaped electrodes 4. In so doing, the ends 9 of the electrodes 4, 5 are made chamfered at an angle of 45°-60° to the longitudinal axis of the housing 1 and form tapered portions designed to reduce the hydraulic resistance upon the movement of pulp.

Provided on the inlet and outlet openings 2 and 3 of the electroplasmolyzer housing 1 are connecting pipes 18 and 19 coupled to the housing 1 by means of flange joints 20 and 21; the latter flange joints are grounded. The connecting pipes 18 and 19 serve to join the electroplasmolyzer, by means of a flexible hose, to pulp pump, or the electroplasmolyzer is directly built in a metal pulp-conveying line with the aid of welded joints in the line section between the pump and press (not shown in the drawing).

Figure 9:
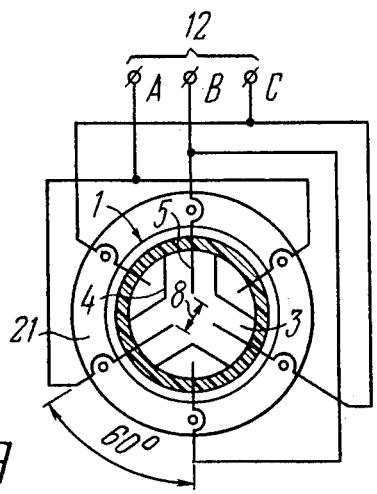
FIG. 9 shows a cross-section of the electroplasmolyzer, taken along the line IX-IX of FIG. 8, with a circuit diagram of electrode connection to the power supply, according to the present invention.

FIG. 9 is a cross-sectional view of the electroplasmolyzer comprising the cylindrical housing 1, with a circuit diagram of connections of the electrodes 4 and 5 in the case of a three-phase power supply 12.

The sector-shaped electrodes 4 and the electrodes 5 are positioned on the inner surface of the electroplasmolyzer housing 1 at an angle of 120° to each other and equidistantly from each other, the gap 8 between the edges of the electrodes 5 being equal to or less than the distance between the electrodes 5 and the sector-shaped electrodes 4. A flange 21 is attached to the housing 1.

The circuit diagram of connections of the electrodes 4 and 5 allows for the alternation of phases between the electrodes 5 with plane contact surface and sector-shaped electrodes 4. For example, the electrode 5 with plane contact surface (top center) is connected to phase B, the sector-shaped electrode 4 which follows in a clockwise direction is connected to phase A, then the electrode 5 is connected to phase C, electrode 4 to phase B, electrode 5—to phase A and so on. All six electrodes 4, 5 are uniformly distributed between the three phases A, B and C of the power supply 12.

The electroplasmolyzer according to the present invention operates in the following manner.

Comminuted vegetable stock from, say, a disk crusher (not shown in the drawing) is fed to the housing 1 (FIGS. 1, 2, 3) of the electroplasmolyzer via the inlet opening 2 and further delivered to the electrodes 4, 5 positioned equidistantly from each other and attached to opposite walls 6 and 7. In so doing, voltage from the three-phase a.c. power supply 12 is applied to the electrodes 4 and 5, and the continuously moving vegetable pulp is treated with electric current. The electric current simultaneously affects all of the vegetable cells left intact after mechanical comminution of vegetable stock and, owing to translatory vibration of ions, protein coagulates in the cytoplasm, plasma bunches are formed and channels for the outlet of cell juice.

Foreign matter carried by the stock is moved over the chamfered ends 9 of the electrodes 5 and, via the gap 8 formed by two rows of the electrodes 5, is delivered together with electrically treated pulp to the outlet opening 3 of the housing 1, to the regulating valve 10 whose expansion angle is adjusted by means of the spring 11. The regulating valve 10 makes for the development of pulp delivery pressure inside the housing 1, thereby eliminating voids in the pulp and ensuring a good contact of the pulp with the electrodes 4 and 5.

Adjacent electrodes 5, as well as electrodes 4, in each pair thereof are connected to different phases A, B, C, thereby ensuring a fuller and more uniform processing of the pulp and increased yield of juice.

The voltage from the power supply 12, applied to the electrodes 4 and 5, is adjusted depending on the type and variety of the stock being processed. For instance, summer applies are processed at lower voltage and autumn apples at higher voltage. While so doing, the efficiency of electroplasmolysis is increased.

Analogous is the process of plasmolysis in an electroplasmolyzer featuring a somewhat different arrangement of the electrodes 4, 5 in the housing 1 (FIGS. 4, 5).

Comminuted stock from a disk crusher is fed to the housing 1 via the inlet opening 2. The pulp is distributed between the square-shaped electrode 4 and identical electrodes 5 on the walls 6 and 7 of the housing 1. While so doing, voltage from the power supply 12 is applied to the electrodes 4 and 5. The pulp comes in contact with the electrodes 4 and 5 to be subjected to the effect of electric current, which results in an increased cell permeability of the pulp and higher yield of juice upon pressing.

In case fibrous foreign matter is introduced with the stock and possibly deposit on the end faces of the electrodes 5, use is made of chamfered ends 9 provided in the electrodes 5 on the side of the inlet opening 2. Upon movement of the pulp, foreign matter slides over the chamfered ends 9 of the electrodes 5 to move down the gap 8 and to the outlet opening 3. This ensures an unobstructed movement of the pulp being processed between the electrodes 4 and 5. The delivery pressure of the pulp inside the housing 1 is ensured by the valve 10 provided with springs 11. In so doing, the pulp gets compacted and a reliable electric contact is formed between the pulp and the electrodes 4 and 5, thereby ensuring effective electric processing of the pulp and increased yield of juice. The degree of pulp delivery pressure is adjusted with the aid of the springs 11.

The electrodes 5 and the square-shaped electrode 4 are connected to different phases A, B, C and, therefore, all of the electrodes 4, 5 are working ones and the process of stock plasmolysis in the flow is continuous. The electrodes 5 inside the housing 1 provide for a large surface of contact with vegetable stock being processed, without restricting its flow area. This renders the electroplasmolyzer of the invention highly efficient and reliable in operation.

The electroplasmolyzer whose housing 1 (FIGS. 6, 7) includes sections 13, 14, 15 operates somewhat differently. Comminuted stock in the form of shavings is fed to the housing 1 via the inlet opening 2 of the section 13. The shavings fill the inner space of the housing 1 in all of the three sections 13, 14 and 15 and is distributed between the electrodes 4 and 5 attached to the walls 6 and 7. Then, the shavings go down by gravity and fill the casing 16 which assists in distributing the shavings in the hopper of a diffuser (not shown in the drawing) in the production line.

The shavings move in the housing 1 without obstruction because the constituent sections 13, 14 and 15 are arranged in a pattern of increasing cross-sectional area. Also conducive to the development of a continuous flow are jet injectors 17 through which liquid is injected for wetting the shavings. While so doing, a.c. voltage is applied to the electrodes 4 and 5 and the jet injectors 17, which affects the vegetable stock to destroy the cytoplasm in the cells, thereby facilitating water diffusion at lower temperature and reducing considerably the transition of non-sugars to juice.

Owing to sectional expansion of the housing 1, it is permitted to install the electroplasmolyzer at an angle of up to 45° to the vertical, whereby the apparatus of the invention may be used in production lines somewhat differing from each other due to possible changes in the position of production equipment.

Adjacent electrodes 4 and 5 in the sections 13, 14, 15, as well as the opposite jet injectors 17, are connected to different phases A, B, C of the power supply 12. In addition, the electrodes 5 and the jet injectors 17 positioned on the same side are likewise connected to different phases A, B, C. The casing 16 is reliably grounded. As a result, the process of electroplasmolysis of beet and like shavings in a flow is continuous. The electroplasmolyzer of the invention is mounted above the hopper of a diffuser and regulates the beet delivery pressure therein; the electroplasmolyzer further makes for a considerable increase of cell permeability, reduction on the diffusion juice temperature and improvement of quality thereof.

The electroplasmolyzer with cylindrical housing 1 (FIGS. 8, 9) works in combination with a pulp pump (not shown in the drawing). Comminuted vegetable stock such as pulp is pump-fed to the housing 1 via the inlet opening of the connecting pipe 18 coupled to the electroplasmolyzer housing 1 by means of the flange joint 20. The pulp passes round the chamfered ends 9 of the sector-shaped electrodes 4 and of the electrodes 5 to be uniformly distributed between the electrodes 4, 5. While so doing, a.c. voltage from the power supply 12 is applied to the electrodes 4, 5 and the continuously moving pulp is subjected to electric processing. The plasmolyzed pulp under pressure leaves the housing 1 through the outlet opening 3 of the connecting pipe 19 with flange joint 21 and delivered via pipeline to a drain or press (not shown in the drawing). The pulp processing takes place in a closed plasmolysis chamber inaccessible to atmospheric oxygen, thereby ruling out the sticking of vegetable stock to the electrodes 4, 5 and precluding the oxidation process.

The number of the electrodes 4 and 5 of the electroplasmolyzer is divisible by three and, therefore, they are connected to three phases A, B, C of the power supply 12, which ensures a short-duration electric processing of the pulp directly in the flow, the flow area of the electroplasmolyzer housing 1 being enlarged owing to the fact that the electrodes 5 are positioned between the sector-shaped electrodes 4, whereby the surface of contact with vegetable stock being processed can be enlarged and the apparatus capacity increased. The electric processing results in an improved permeability of cell tissue and higher yield of juice produced therefrom.

The herein disclosed electroplasmolyzer for processing vegetable stock wherein the electrodes 4, 5 are rationally positioned on the inner surface of the housing 1 makes for a more complete processing of fruit, vegetables and root crops which yield insufficient amount of juice and other nutritious substances without electric processing and retain too much moisture in the marc, as a result of which considerable amount of liquid fuel is required for drying the marc. Using the electroplasmolyzer of the invention, a 5–10% increase in the yield of fruit and vegetable juice can be attained for the loss of the minimum amount of electric power. The electroplasmolyer contains a divisible by three number of electrodes 4, 5 connected to the power supply 12 having three phases A, B, C.

The herein disclosed electroplasmolyzer for processing vegetable stock is simple of design, compact, can be readily manufactured, provides for unobstructed passage and good processing of vegetable stock, can be readily assembled in a production line, is reliable and safe in operation. It helps considerably increase the output and efficiency.

Figure 10:
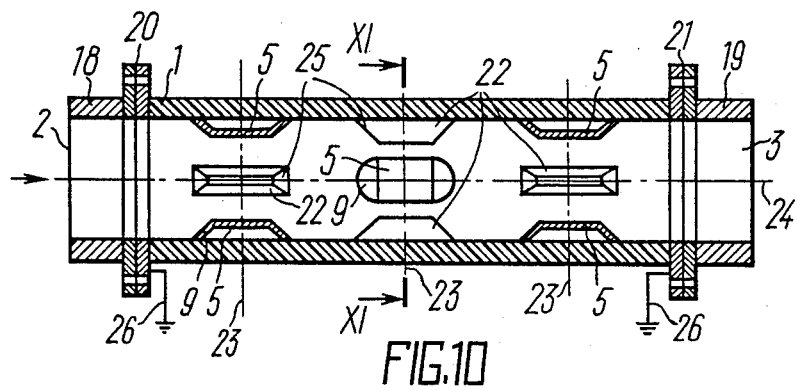
FIG. 10 is a longitudinal sectional view of an electroplasmolyzer having a cylindrical housing according to the invention.

In FIG. 10, electrodes 5 are shown and ends 25 of the electrodes 22 and shown as rounded so as to reduce drag when the stock flows through.

The pipes 18 and 19 located at the longitudinally extending inlet and outlet openings 2 and 3 of the housing 1 are connected to the housing 1 by means of flange joints 20 and 21. The electroplasmolyzer is incorporated directly into a metal pulp-conveying line by means of welded joints in the zone between a pump and a press (not shown). The flange joints 20 and 21 are connected to a common bus 26.

Figure 11:
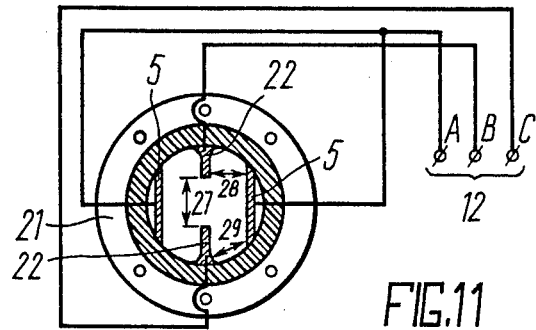
FIG. 11 is a cross-sectional view of an electroplasmolyzer taken along line XI-XII in FIG. 10 according to the invention.

FIG. 11 shows a cross-sectional view of an electroplasmolyzer having the cylindrical housing 1 with a diagram of connections of the electrodes 5 and 22 to the three-phase power supply 12. A distance 27 between the end faces of the electrodes 22 in each pair of electrodes 22 is equal to a distance 28 between the electrodes 5 and 22. The peripheral surface of each electrode 22 is conjugated with its base by a surface of a radius 29 equal to the distance 28 between the electrodes 5 and 22. Each of the electrodes 22 and adjacent electrodes 5 of the pair are connected to different phases A,B,C of the power supply 12. Thus the electrode 22 (the top at the center) is connected to the phase B, the next electrode 5 in the clockwise direction is connected to the phase A, the next electrode 22 is connected to the phase C, and the next electrode 5 is connected to the phase A.

Figure 12:
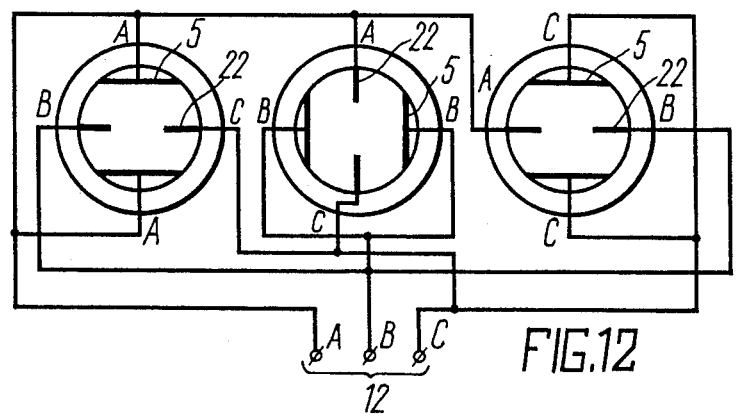
FIG. 12 is a diagram of electrical connections of electrodes to a three-phase power supply according to the invention.

FIG. 12 shows a diagram of electrical connections of the groups of electrodes 5 and 22 to the three-phase power supply 12. The electric circuitry for connecting the electrodes 5 and 22 is so constructed that each of adjacent electrodes 5 in a pair located along the housing 1 is connected to different phases A,B,C of the power supply 12. The electrodes 5 and 22 having their axes of symmetry 23 extending in one and the same plane drawn perpendicularly to the longitudinal axis 24 of the housing 1 are connected to one and the same and different phases, respectively, of the power supply 12. Thus a first pair of electrodes 5 of the first group are connected to the phase A and electrodes 22 of a first pair of the second group are connected to the phases B and C; the second pair of electrodes 5 of the first group are connected to the pase B and electrodes 22 of the second pair of the second group are connected to the phases A and C; and the third pair of electrodes 5 of the first group are connected to the phase C and electrodes 22 of the third pair in the second group are connected to the phases A and B. This configuration of connections of the electrodes 5 and 22 allows for one and the same number of electrodes 5 and 22 to be connected to each phase A, B, C of the power supply 12. It will be therefore apparent that electrodes 22 of each pair in the second group are connected to different phases A, B, C. In the same manner, each pair of adjacent electrodes 5, 22 spaced along a circle in a plane drawn perpendicularly to the longitudinal axis 24 of the housing 1 is connected to different phases A, B, C of the power supply 12.

The electroplasmolyzer having the cylindrical housing 1 (FIG. 10) functions together with a pulp pump (not shown). A communuted vegetable stock such as pulp in fed under pressure by the pulp pump to the housing 1 through the inlet opening 2 of the pipe 18 connected to the housing 1 of the electroplasmolyzer by means of the flange joint 20. The pulp flows around the rounded ends 9 and 25 of the electrodes 5 and 22, respectively, to be uniformly distributed between the electrodes 5 and 22. As the vegetable stock is admitted to the processing zone, each of the plurality of electrodes 5 and 22 comes into play. Alternating voltage from the power supply 12 (FIG. 12) is fed to the electrodes 5 and 22, and the continually moving pulp is treated with electric current.

Processing occurs in the unobstructed passage defined adjacent to the terminal portions of the plurality of electrodes 5 and 22 of the electroplasmolyzer at a concentration of the vegetable stock selected within the range from 600 kg/m$^3$ to 1100 kg/m$^3$ and specific electric energy consumption with the range from 0.2 VA/kg h to 2.4 VA/kg h. A change in concentration of stock in the electrical processing zone results in a change in the degree of contact between the stock and electrodes. At low concentrations below 600 kg/m$^3$ it is not possible to achieve complete electrical treatment of the vegetable stock since the stock is not treated at points of poor contact with the electrodes 5, 22. It should be noted that at points where there is a good contact between the stock and electrodes 5, 22, the stock starts being heated intensely which results in a substantial increase in energy consumption—above 2.4 VA/kg h and decrease in efficiency of processing.

With an electric energy consumption below 0.2 VA/kg h efficiency of processing is low since the supplied energy is not sufficient for performing the electric treatment process.

If the energy supply is greater than 2.4 VA/kg h substantial losses of energy occur because of temperature rise of the vegetable stock being processed.

With a stock concentration in the electrical treatment zone above 1100 kg/m$^3$ electric energy consumption for performing the treatment process decreases. Further increase in concentration of the stock in the electrical treatment zone would not change electric energy consumption since complete contact between particles of comminuted mass of the stock is ensured at the concentration of 1100 kg/m$^3$. Therefore, the range of concentrations of the comminuted mass in the electrical treatment zone is chosen in the range from 600 kg/m³ to 1100 kg/m³. Electric energy consumption for electrical treatment is within the range from 0.2 VA/kg h to 2.4 VA/kg h. Processing of vegetable stock under the abovementioned conditions ensures an improvement of yield of juice from fruit and berry stock and beet plants.

A voltage fed to the plurality of electrodes 5, 22 has a value which varies depending on the difference between temperatures at the outlet and inlet openings 3, 2 of the housing 1. For that purpose, electric current is caused to flow through the vegetable stock, temperature of the vegetable stock is measured at the outlet opening 3 and at the inlet opening 2 of the housing 1 of the electroplasmolyzer, the difference between the temperature is determined and compared with the value of a signal from a pick-up (not shown), and voltage at the electrodes 5, 22 of the electroplasmolyzer is varied in accordance with the resultant difference between temperatures of the vegetable stock at the outlet and inlet openings 3, 2 of the housing 1 of the electroplasmolyzer. Voltage is fed to each pair of adjacent electrodes 5, 22 from different phases A, B, C of the three-phase power supply 12 as the vegetable stock is admitted to, and fed out of said zone of electrical treatment. The plasmolyzed pulp under pressure leaves the housing 1 (FIG. 10) through the outlet opening 3 of the pipe 19 having the flange joint 21 and is fed through a pipeline to a drain or press (not shown). The pulp is treated in the closed plasmolysis chamber without access of air oxygen so as to avoid burning of the stock on the electrodes 5 and 22 and occurrence of oxidation processes.

The number of the electrodes 5 and 22 of the electroplasmolyzer is a multiple of three so that they are connected to the three phases A,B,C (FIG. 12) of the power supply 12 thus ensuring a short-time treatment of pulp in continuous flow, the cross-sectional area of the housing 1 (FIG. 10) of the electroplasmolyzer being enlarged owing to the installation of the electrodes 22 between the electrodes 5 having a planar contact surface thus minimizing resistance of the electrode system to the movement of the flowing vegetable stock and also allowing the contact surface between electrodes and the stock being processed to be increased with an improvement of the throughput capacity of the apparatus. The electrical treatment results in a better permeability of cell tissue, and juice yield is improved.

The electroplasmolyzer having a rational arrangement of the electrodes, 5, 22 ensures highly efficient electrical treatment of fruits, vegetables and beet plants which yield low quantities of juice and other nutrient substances without electrical action thereupon. The electroplasmolyzer allows the yield of juice from fruits and vegetables to be substantially improved. The electroplasmolyzer is simple in structure, compact and easy to manufacture; it ensures an unobstructed handling and processing of vegetable stock and is easy to incorporate in a production line. The apparatus is safe and reliable in operation.

We claim:

1. An electroplasmolyzer for processing vegetable stock, said electroplasmolyzer comprising:
   a housing defining an inlet opening and an outlet opening;
   the inner surface of said housing;
   a three-phase power supply;
   phases of said three-phase power supply;
   a plurality of electrodes, each electrode of said plurality of electrodes having a terminal portion and a planar surface for contacting said vegetable stock, said plurality of electrodes being distributed on said inner surface of said housing and connected to said three-phase power supply in such a manner that said adjacent electrodes are connected to different phases of said three-phase power supply; and
   an unobstructed passage extending through said housing, said unobstructed passage being defined adjacent to said terminal portions of said plurality of electrodes.

2. An electroplasmolyzer for processing vegetable stock according to claim 1, wherein
   there are two said electrodes, each of the two electrodes being located along opposite walls of said housing along the whole width of said walls;
   the rest of said electrodes being of identical shape and having chamfered ends on the side of said inlet opening of said housing, said electrodes being located between said two electrodes and said remaining electrodes having their end faces located on one of the two other walls of said housing at a distance equal to from 0.2 to 0.4 of the width of one of said two electrodes located along the whole width of said wall of said housing;
   and a gap between the opposite end faces of said remaining electrodes of identical shape being equal to from 0.2 to 0.4 of the width of one of said two electrodes located along the whole width of said wall of said housing.

3. An electroplasmolyzer for processing vegetable stock according to claim 1, wherein
   one of said electrodes, which is U-shaped, is located on three walls of said housing;
   and the rest of said electrodes being of identical shape and having their end faces located on the fourth wall of said housing, with a gap being defined between the free end faces of the remaining electrodes and a cross-piece of said U-shaped electrode which is equal to from 0.2 to 0.4 of the width of one leg of the U-shaped electrode, the end faces of the rest of the electrodes being chamfered on the side of said inlet opening of said housing.

4. An electroplasmolyzer for processing vegetable stock according to claim 1 further comprising:
   a movable casing for said housing;
   said housing including at least three sections which are aligned in succession with an increase in the cross-sectional area;
   some of said plurality of electrodes within each of said sections of said housing being located on two opposite walls of said housing at right angles with respect to the longitudinal axis of said housing, the number of said some electrodes being a multiple of three;
   the rest of said plurality of electrodes within each of said sections of said housing extending in parallel with the longitudinal axis of said housing on the two other walls of the housing, the number of the rest of said electrodes being a multiple of three; and
   two rows of nozzles being mounted in two of said sections having the smaller cross-sectional area and being located between the rest of said plurality of electrodes.

5. An electroplasmolyzer for processing vegetable stock according to claim 1, wherein
   said housing is cylindrical;
   some of said plurality of electrodes are sector-shaped and have a planar surface for contacting said vegetable stock being processed and are equally spaced at an angle of 120° from one another on the inner surface of said housing;

the rest of said plurality of electrodes having a planar surface for contacting said vegetable stock being processed, being equidistantly spaced at an angle t of 120° from one another between said sector-shaped electrodes equidistantly with respect thereto;

the distance between end faces of said remaining electrodes having a planar contact surface being equal to the distance between said sector-shaped electrodes and said remaining electrodes having a planar contact surface;

the rest of said electrodes having a planar contact surface and said sector-shaped electrodes having their end faces on the side of said inlet opening of said housing chamfered with respect to the longitudinal axis of said housing.

6. An electroplasmolyzer for processing vegetable stock according to claim 2, wherein
said distance between the rest of said electrodes is determined by the formula $d/\Delta = N - 2$ and $$E_{min} \leq V/\Delta \leq E_{max},$$

wherein:
d is the width of the wall of said housing on which said identically shaped electrodes are mounted;
$\Delta$ is said distance between said electrodes;
N is the total number of said electrodes;
V is the voltage of said power supply;
$E_{min}$ is the minimum value of intensity of the electric field;
$E_{max}$ is the maximum value of itensity of the electric field.

7. An electroplasmolyzer for processing vegetable stock according to claim 2, comprising the rest of said electrodes chamfered of an angle of 30° to 60° with respect to the longitudinal axis of said housing; a control valve mounted adjacent to the outlet opening of said housing.

8. An electroplasmolyzer for processing vegetable stock according to claim 3, wherein
said distance between the rest of said electrodes is determined by the formula $d/\Delta = N - 1$ and $$E_{min} \leq V/\Delta \leq E_{max},$$

wherein
$E_{min}$ is the minimum value of intensity of the electric field;
$E_{max}$ is the maximum value of intensity of the electric field;
d is the width of the wall of said housing on which said identically shaped electrodes are mounted;
$\Delta$ is said distance between said electrodes;
N is the total number of said electrodes;
V is the voltage of said power supply.

9. An electroplasmolyzer for processing vegetable stock according to claim 3, comprising
the rest of said identically shaped electrodes chamfered at an angle of 30° to 60° with respect to the longitudinal axis of said housing;
and a control valve mounted adjacent to the outlet opening of said housing.

10. An electroplasmolyzer for processing vegetable stock according to claim 4, wherein
said two rows of nozzles are connected to said different phases of said three-phase power supply.

11. An eletroplasmolyzer for processing vegetable stock according to claim 6, comprising
the rest of said identically shaped electrodes chamfered with respect to the longitudinal axis of said housing at an angle of 30° to 60°;
and a control valve mounted adjacent to said outlet opening of said housing.

12. An electroplasmolyzer for processing vegetable stock according to the claim 8, comprising
the rest of said identically shaped electrodes chamfered at an angle of 30° to 60° with respect to the longitudinal axis of said housing;
and a control valve mounted adjacent to said outlet opening of said housing.

13. An electroplasmolyzer for processing vegetable stock according to claim 6, wherein the value of $E_{min}$ is 50 V/cm and the value of $E_{max}$ is 400 V/cm.

14. An electroplasmolyzer for processing vegetable stock according to claim 8, wherein the value of $E_{min}$ is equal to 50 V/cm and the value of $E_{max}$ is equal to 400 V/cm.

15. An electroplasmolyzer for processing vegetable stock according to claim 1, comprising
said housing which is cylindrical in shape; a longitudinal axis of said housing;
an axis of symmetry of said electrodes having a planar surface for contacting vegetable stock;
adjacent electrodes in each pair having a planar surface for contacting vegetable stock located along said housing being connected to different phases of said three phase power supply;
each of said two identically shaped electrodes having a planar contact surface for contaciing vegetable stock being mounted opposite to each other and forming a pair of said electrodes having a planar contact surface for contacting vegetable stock;
a first, second and third pairs of said electrodes having a planar contact surface for contacting vegetable stock extending along said housing forming a first group of said electrodes having a planar contact surface; each of said pairs of said electrodes being mounted at the angle of 90° with respect to each other;
identically shaped electrodes located between said electrodes having a planar contact surface having end faces, peripheral surfaces, bases and axes of symmetry;
each of said electrodes connected to different phases of said three-phase power supply being mounted opposite to each other and forming a pair of said electrodes;
a first, second and third said pairs of said electrodes forming a second group of said electrodes; each one of said pairs being located between said electrodes having a planar contact surface of each said pair in said first group;
said axes of symmetry of said electrodes of said first, second and third pairs of said first group extending in one and the same plane drawn perpendicularly to the longitudinal axis of said housiing with said axes of symmetry of said electrodes of the first, second and third pairs of said second group, respectively;
the distance between said end faces of said electrodes in each of the first, second and third pairs of said second group being equal to the distance between said electrode in the first, second and third pair of said first group, respectively, and said electrode in the first, second and third pair of said second group, respectively;

said peripheral surface of said each electrode of each said pair of said second group being conjugated with said base by a surface of a radius which is equal to the distance between said electrode having a planar contact surface for contacting vegetable stock of said first, second and third pair of said first group and said electrode of said first, second and third pair of said second group, respectively;

each of adjacent electrodes of a pair of electrodes spaced along a circle in said plane drawn perpendicularly to said longitudinal axis of said housing being connected to different phases of said three-phase power supply.

16. An electroplasmolyzer for processing vegetable stock according to claim 15, wherein
said end faces of said all electrodes are rounded.

* * * * *